US012803826B2

(12) United States Patent
Ueno

(10) Patent No.: US 12,803,826 B2
(45) Date of Patent: Nov. 17, 2026

(54) IMAGE PICKUP APPARATUS CAPABLE OF GUARANTEEING AUTHENTICITY OF CONTENT DISTRIBUTED IN REAL TIME WHILE PHOTOGRAPHING, CONTENT MANAGEMENT APPARATUS, CONTROL METHOD FOR IMAGE PICKUP APPARATUS, CONTROL METHOD FOR CONTENT MANAGEMENT APPARATUS, AND STORAGE MEDIUM

(71) Applicant: CANON KABUSHIKI KAISHA, Tokyo (JP)

(72) Inventor: Daiyu Ueno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 18/521,219

(22) Filed: Nov. 28, 2023

(65) Prior Publication Data

US 2024/0205033 A1 Jun. 20, 2024

(30) Foreign Application Priority Data

Dec. 19, 2022 (JP) ................................ 2022-202069

(51) Int. Cl.
*H04L 9/00* (2022.01)
*H04L 9/32* (2006.01)

(52) U.S. Cl.
CPC .............. *H04L 9/50* (2022.05); *H04L 9/3297* (2013.01)

(58) Field of Classification Search
CPC ........ H04L 9/50; H04L 9/3297; H04L 9/3239
USPC ............................................................ 380/28
See application file for complete search history.

(56) References Cited

U.S. PATENT DOCUMENTS

| | | | | |
|---|---|---|---|---|
| 11,062,042 | B1 * | 7/2021 | McKervey | G06F 16/137 |
| 2003/0212893 | A1 * | 11/2003 | Hind | H04L 9/3247 713/177 |
| 2018/0077170 | A1 * | 3/2018 | Glazner | H04N 21/4623 |
| 2020/0076625 | A1 * | 3/2020 | Kass | G06F 16/1834 |
| 2020/0127812 | A1 * | 4/2020 | Schuler | H04L 9/0637 |
| 2020/0155944 | A1 * | 5/2020 | Witchey | H04L 9/3239 |

(Continued)

FOREIGN PATENT DOCUMENTS

| | | | | |
|---|---|---|---|---|
| JP | 2017-204706 A | | 11/2017 | |
| JP | 2019133650 A | * | 8/2019 | |

OTHER PUBLICATIONS

U.S. Appl. No. 18/525,188, filed Nov. 30, 2023 by Daiyu Ueno, et al.

(Continued)

*Primary Examiner* — Meng Vang
(74) *Attorney, Agent, or Firm* — VENABLE LLP

(57) ABSTRACT

An image pickup apparatus capable of guaranteeing the authenticity of a content distributed in real time while photographing is provided. The image pickup apparatus includes a controller configured or programmed to function as a distribution data transmitting unit that transmits distribution data used for live distribution of a video image photographed, a hash value generating unit that generates a hash value of the distribution data at a predetermined interval, and a transmitting unit that transmits the hash value and information, which indicates a timing when the hash value has been generated, to a content management apparatus that registers the hash value in a blockchain.

8 Claims, 8 Drawing Sheets

(56) References Cited

U.S. PATENT DOCUMENTS

| | | | | |
|---|---|---|---|---|
| 2020/0336907 | A1* | 10/2020 | Jain | H04L 9/3236 |
| 2021/0064881 | A1 | 3/2021 | Diggins | |
| 2021/0344498 | A1 | 11/2021 | Perunov | |
| 2022/0012276 | A1* | 1/2022 | Chou | G06F 16/48 |
| 2023/0087478 | A1* | 3/2023 | Jayaram | G06F 16/2365 705/37 |

OTHER PUBLICATIONS

Japanese Office Action issued Jul. 27, 2026 during prosecution of corresponding Japanese application No. 2022-202069. (English-Language machine translation included.).

* cited by examiner

FIG. 5

407 501 502 503 504

| BLOCK ID | AUTHENTICITY GUARANTEE NUMBER | CONTENT NAME | DIVIDED SECTION |
|---|---|---|---|
| 0 | 12340001 | MUSIC LIVE | SECTION 1 (00:00～02:59) |
| 1 | 12340002 | MUSIC LIVE | SECTION 2 (03:00～05:59) |
| 2 | 12340003 | MUSIC LIVE | SECTION 3 (06:00～09:59) |
| 3 | 12350001 | CAT OBSERVATION LIVE | SECTION 1 (00:00～02:59) |
| 4 | 12350002 | CAT OBSERVATION LIVE | SECTION 2 (03:00～05:59) |

IMAGE PICKUP APPARATUS CAPABLE OF GUARANTEEING AUTHENTICITY OF CONTENT DISTRIBUTED IN REAL TIME WHILE PHOTOGRAPHING, CONTENT MANAGEMENT APPARATUS, CONTROL METHOD FOR IMAGE PICKUP APPARATUS, CONTROL METHOD FOR CONTENT MANAGEMENT APPARATUS, AND STORAGE MEDIUM

BACKGROUND OF THE INVENTION

Field of the Invention

The present invention relates to an image pickup apparatus, a content management apparatus, a control method for the image pickup apparatus, a control method for the content management apparatus, and a storage medium.

Description of the Related Art

In recent years, information sharing by the Internet and social networking services (SNS) has become active, and anyone is able to view and transmit information. In particular, a live distribution service, which allows a user to distribute a video image photographed by a digital camera to other users via the Internet in real time, is becoming increasingly popular. Under such circumstances, since the technology for digital image processing has further advanced, it has become difficult for a viewer of information to confirm the authenticity of the content of the information, so that problems such as fake news have become serious. In order to cope with such problems, there is an increasing demand for a mechanism that guarantees the authenticity of digital images (i.e., guarantees that no processing or falsification has been performed with respect to the digital images).

As the mechanism for guaranteeing the authenticity of the digital images, the use of a blockchain technology widely utilized in various kinds of industries including finance has been studied. The blockchain technology can prevent falsification of digital data in a decentralized manner and at low cost.

For example, a management system, which uses the blockchain technology, registers a hash value of a content generated by a content generation apparatus and metadata accompanying the content in a blockchain as information about the content. Thereby, the authenticity of the content from the time of generation of the content is guaranteed (for example, see Japanese Laid-Open Patent Publication (kokai) No. 2017-204706). As a result, it becomes possible to obtain a content that has not been processed from the time of generation from the management system and publish the obtained content on the Internet, the SNS, or the like.

Here, in Japanese Laid-Open Patent Publication (kokai) No. 2017-204706 described above, when the management system registers the information about the content in the blockchain, the content generation apparatus needs to obtain the hash value of the content. For example, when the management system registers information about moving image data generated by the content generation apparatus in the blockchain, the content generation apparatus generates a moving image file including the moving image data and metadata accompanying the moving image data, and calculates a hash value of the moving image file. However, in live distribution, data of the video image photographed by the content generation apparatus is not converted into a file but is transmitted directly to a distribution server in real time, so it is not possible to calculate the hash value of the file. For this reason, it is not possible to guarantee the authenticity of a real-time content such as distribution data used for the live distribution of the video image photographed.

SUMMARY OF THE INVENTION

The present invention provides an image pickup apparatus, a content management apparatus, a control method for the image pickup apparatus, a control method for the content management apparatus, and a storage medium that are capable of guaranteeing the authenticity of a content distributed in real time while photographing.

Accordingly, the present invention provides an image pickup apparatus comprising a controller configured or programmed to function as a distribution data transmitting unit that transmits distribution data used for live distribution of a video image photographed, a hash value generating unit that generates a hash value of the distribution data at a predetermined interval, and a transmitting unit that transmits the hash value and information, which indicates a timing when the hash value has been generated, to a content management apparatus that registers the hash value in a blockchain.

Accordingly, the present invention provides a content management apparatus comprising a controller configured or programmed to function as an obtaining unit that obtains, from an image pickup apparatus, distribution data used for live distribution of a video image photographed, a first hash value generated based on the distribution data at a predetermined timing, and information indicating a timing when the first hash value has been generated, a second hash value generating unit that generates a second hash value based on the distribution data according to the information indicating the timing, an identification number generating unit that generates an identification number for identifying the distribution data, and a registering unit that, in a case that the first hash value and the second hash value match, registers the first hash value and the information indicating the timing in a blockchain in association with the identification number.

According to the present invention, it is possible to guarantee the authenticity of the content distributed in real time while photographing.

Further features of the present invention will become apparent from the following description of exemplary embodiments with reference to the attached drawings.

BRIEF DESCRIPTION OF THE DRAWINGS

FIG. 5 is a diagram that shows an example of a configuration of a distribution database shown in FIG. 4.

DESCRIPTION OF THE EMBODIMENTS

The present invention will now be described in detail below with reference to the accompanying drawings showing embodiments thereof.

Figure 1:
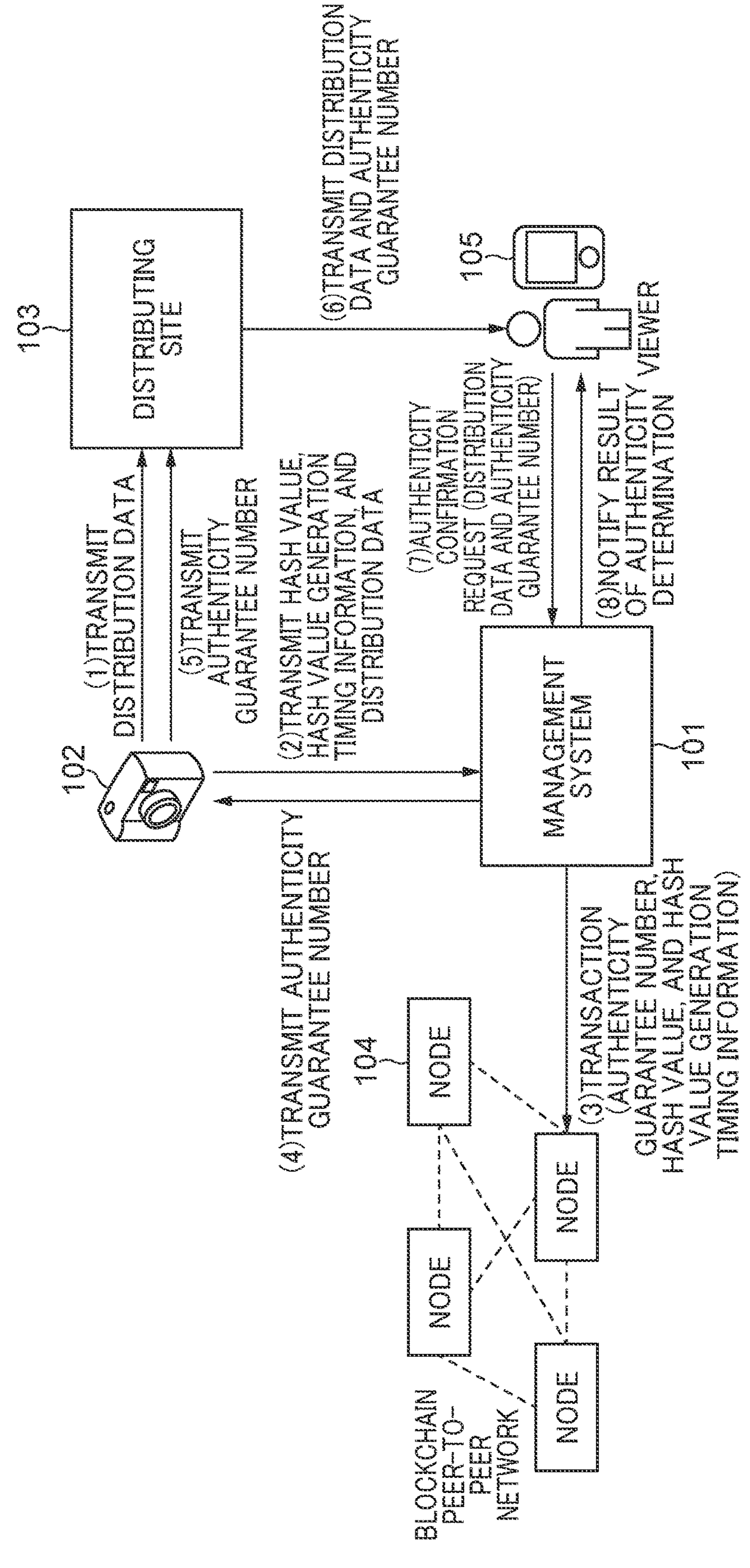
FIG. 1 is a diagram for explaining functions of a management system that functions as a content management apparatus according to a preferred embodiment of the present invention.

FIG. 1 is a diagram for explaining functions of a management system 101 that functions as a content management apparatus according to a preferred embodiment of the present invention.

The management system 101 includes a function of managing contents obtained from an external apparatus such as an image pickup apparatus 102 via the Internet or the like. The management system 101 is implemented by one or more computer apparatuses. It should be noted that in the preferred embodiment of the present invention, although a configuration, in which the management system 101 also communicates with and uses a blockchain peer-to-peer network 104, will be described below, the present invention is not limited to this configuration, and may be implemented by using another network.

As shown in FIG. 1, for example, when the image pickup apparatus 102 performs a photographing operation (an image pickup operation), the image pickup apparatus 102 transmits distribution data obtained by the photographing operation to a distributing site 103 described below (a step (1)). The distribution data is data for live distribution of a video image photographed by the image pickup apparatus 102, and includes moving image data, audio data, and metadata. In transmitting the distribution data, a communication protocol such as real-time messaging protocol (RTMP) is used.

Next, the image pickup apparatus 102 generates a hash value of the distribution data at a predetermined interval after starting transmission of the distribution data. The hash value is a value obtained by executing a hash function with respect to the distribution data. Examples of a timing for generating the hash value include a timing when a predetermined time has elapsed after starting the transmission of the distribution data, a timing when a predetermined number of frames have passed after starting the transmission of the distribution data, a timing when the image pickup apparatus 102 has moved by a predetermined distance or more, and a timing when a subject of the video image photographed has been switched to another subject (for example, another person or object).

Furthermore, the image pickup apparatus 102 transmits information about the distribution data required for registration of a blockchain, which will be described below, to the management system 101 at the timing when the hash value has been generated (a step (2)). The information about the distribution data includes the generated hash value, hash value generation timing information, and the distribution data. The hash value generation timing information is information indicating the timing when the hash value has been generated. As described above, in the preferred embodiment, the image pickup apparatus 102 starts the transmission of the distribution data to the distributing site 103, and then, at a predetermined timing, transmits the information about the distribution data required for registration of the blockchain, which will be described below, to the management system 101. This is because that the information about the distribution data only needs to be transmitted at the time of registering in the blockchain, but in order for users to view the real-time video image, it is necessary to transmit the distribution data to the distributing site 103 in real time every time the video image is updated. It should be noted that this is just an example, and the start of the transmission of the distribution data to the distributing site 103 and transmission of the information about the distribution data to the management system 101 may be performed at the same timing.

It should be noted that in the preferred embodiment of the present invention, although the configuration, in which the image pickup apparatus 102 generates the hash value and transmits the hash value to the management system 101, will be described below, the present invention is not limited to this configuration. For example, the management system 101 may generate the hash value based on the distribution data and the hash value generation timing information that are obtained from the image pickup apparatus 102.

Upon receiving the hash value, the hash value generation timing information, and the distribution data from the image pickup apparatus 102, the management system 101 of the preferred embodiment of the present invention generates an authenticity guarantee number, which is a unique number within the management system 101. The authenticity guarantee number is an identification number for identifying the received distribution data. The management system 101 generates transaction data, which includes the hash value, the authenticity guarantee number, and the hash value generation timing information, and connects a block, into which the generated transaction data has been written, to the blockchain. Specifically, the management system 101 issues the generated transaction data and broadcasts the transaction data to one or more computers (nodes) participating in the blockchain peer-to-peer network 104 (a step (3)). Accordingly, the transaction data is temporarily stored in a transaction pool, and a verification is completed when the transaction data is approved by a miner. Then, the block, into which the transaction data has been written, is generated, and is added to the tail of the blockchain.

Furthermore, the management system 101 transmits the authenticity guarantee number to the image pickup apparatus 102 (a step (4)). The image pickup apparatus 102 transmits the authenticity guarantee number received from the management system 101 to the distributing site 103 (a step (5)).

The distributing site 103 includes a function of providing the received distribution data. For example, a viewer of the distributing site 103 is able to select the distribution data to be displayed on the distributing site 103, and the selected distribution data and the authenticity guarantee number associated with the selected distribution data are provided to the viewer. As a method of providing the authenticity guarantee number, for example, a method of saving the authenticity guarantee number as a text file on a hard disk (not shown) of a communication device 105 such as a personal computer or a smartphone operated by the viewer, or a method of displaying the authenticity guarantee number near the distribution data can be considered. It should be noted that the display position of the authenticity guarantee number is just an example, and the authenticity guarantee number may be displayed in a position where the viewer of the distributing site 103 can recognize that it is the authenticity guarantee number corresponding to the distribution data.

The viewer of the distributing site 103 may want to confirm that the distribution data displayed on the distributing site 103 has not been falsified since the time of photographing. In this case, the viewer first uses the communication device 105 to obtain (download) the distribution data and the authenticity guarantee number associated with the distribution data from the distributing site 103 (a step (6)). Specifically, the viewer accesses a web page of the distributing site 103 from the communication device 105, selects the distribution data published on the web page, and issues an instruction to perform a download. In response to this instruction, the distributing site 103 transmits the selected the distribution data and the authenticity guarantee number to the communication device 105.

Upon the completion of the download, the communication device 105 transmits an authenticity confirmation request of the distribution data together with the obtained distribution data and the obtained authenticity guarantee number to the management system 101 (a step (7)). For example, the authenticity confirmation request is made by the viewer using the communication device 105 to attach the distribution data and the authenticity guarantee number that are obtained from the distributing site 103 to an input form provided by the management system 101. It should be noted that the authenticity confirmation request may be made by a method other than the method described above. For example, the authenticity confirmation request may be made by automatically transmitting the distribution data and the authenticity guarantee number that are obtained from the distributing site 103 from the Internet browser of the communication device 105 to the management system 101. Furthermore, the authenticity confirmation request may be made by transmitting an e-mail, to which the distribution data and the authenticity guarantee number that are obtained from the distributing site 103 are attached, to the management system 101.

When the authenticity confirmation request is transmitted from the communication device 105, the management system 101 performs an authenticity determination of the distribution data, which is a target of the authenticity confirmation request. Furthermore, the management system 101 notifies the viewer of the result of the authenticity determination (a step (8)). For example, the management system 101 causes the internet browser of the communication device 105 to display the result of the authenticity determination in the form of an icon or a text. Alternatively, the management system 101 notifies the communication device 105 of the result of the authenticity determination by an e-mail. Alternatively, the management system 101 performs control so that the distribution data determined to has been falsified since the time of generation will not be displayed on the distributing site 103.

Figure 2:
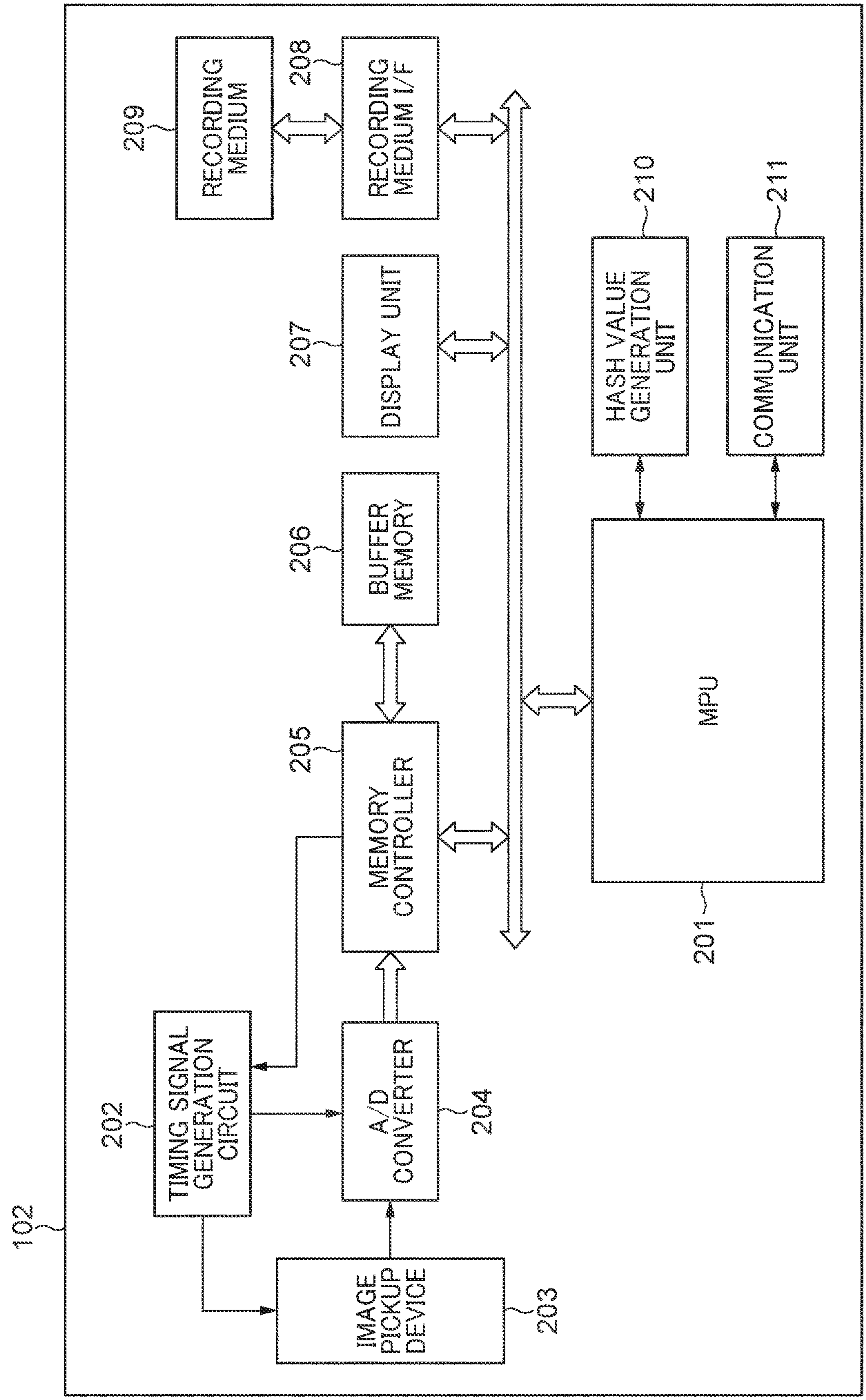
FIG. 2 is a block diagram that schematically shows a configuration of an image pickup apparatus shown in FIG. 1.

FIG. 2 is a block diagram that schematically shows a configuration of the image pickup apparatus 102 shown in FIG. 1. The image pickup apparatus 102 is a camera such as a digital camera or a digital video camera, or an electronic device having a camera function such as a mobile phone having a camera function or a camera-equipped computer.

As shown in FIG. 2, the image pickup apparatus 102 includes an MPU 201, a timing signal generation circuit 202, an image pickup device 203, an A/D converter 204, a memory controller 205, a buffer memory 206, and a display unit 207. In addition, the image pickup apparatus 102 includes a recording medium I/F 208, a recording medium 209, a hash value generation unit 210, and a communication unit 211.

The MPU 201 is a microcontroller for performing a control related to the system of the image pickup apparatus 102 such as a photographing sequence. The timing signal generation circuit 202 generates a timing signal necessary for operating the image pickup device 203. The image pickup device 203 is an image pickup device such as a charge coupled device (CCD) image sensor or a complementary metal oxide semiconductor (CMOS) image sensor that converts reflected light from the subject into electrical signals (analog data) and reads out the electrical signals to the A/D converter 204.

The A/D converter 204 converts the analog data, which is read out from the image pickup device 203, into digital data. The memory controller 205 controls reading and writing of the memory, a refresh operation of the buffer memory 206, etc. The buffer memory 206 stores the distribution data. The display unit 207 displays the video image of the distribution data stored in the buffer memory 206. The recording medium I/F 208 is an interface for controlling reading and writing of data from and to the recording medium 209. The recording medium 209 is, for example, a memory card, a hard disk, or the like, and stores programs, etc. The hash value generation unit 210 generates the hash value by executing the hash function with respect to the distribution data stored in the buffer memory 206 at a predetermined timing. It should be noted that instead of the hash value generation unit 210, the MPU 201 may perform the generation of the hash value. The communication unit 211 is connected to the Internet to transmit and receive data to and from an external apparatus.

Figure 3:
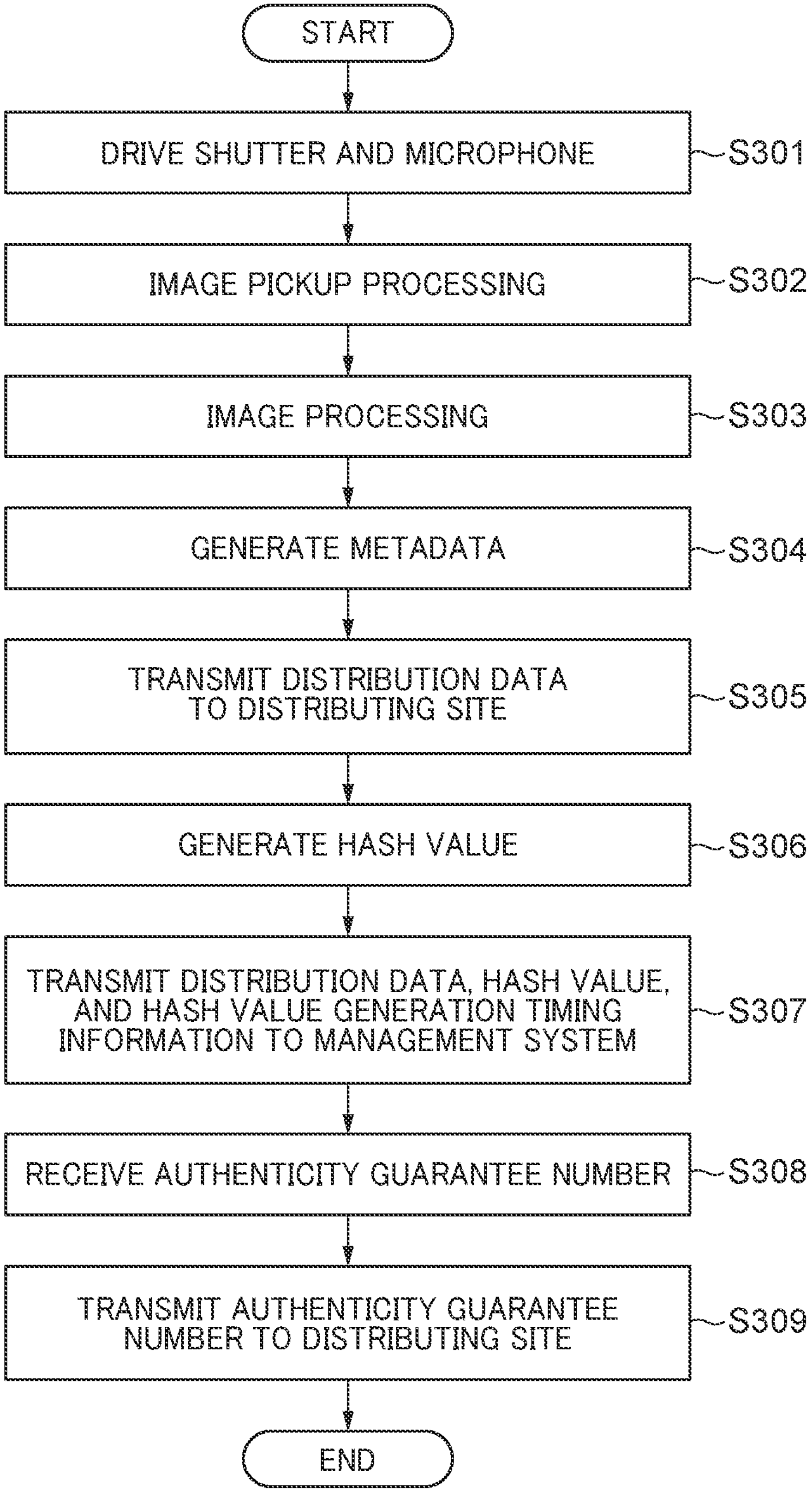
FIG. 3 is a flowchart that shows a procedure of a data transmission processing executed by the image pickup apparatus shown in FIG. 1.

FIG. 3 is a flowchart that shows a procedure of a data transmission processing executed by the image pickup apparatus 102 shown in FIG. 1. The data transmission processing shown in FIG. 3 is implemented by the MPU 201 of the image pickup apparatus 102 executing the program stored in the recording medium 209 or the like. The data transmission processing shown in FIG. 3 is executed when the image pickup apparatus 102 accepts a distributing start operation such as pressing down of a distributing button (not shown) of the image pickup apparatus 102 performed by a photographer.

As shown in FIG. 3, the MPU 201 drives a shutter (not shown) for controlling an exposure time and a microphone (not shown) for recording audio (a step S301). As a result, the audio data for distribution is generated. Next, the MPU 201 performs an image pickup processing that converts the light from the subject, which is received by the image pickup device 203, into the electrical signals (a step S302). Next, the MPU 201 performs image processes such as development and encoding with respect to the data (the electrical signals) obtained by the image pickup processing (a step S303). As a result, the moving image data for distribution is generated. Next, the MPU 201 generates the metadata including attribute information when the image pickup processing for generating the distribution data is executed (the photographer, a photographing time, a photographing location, a model of the image pickup apparatus, setting values at the time of photographing, etc.) (a step S304). Next, the MPU 201, which functions as a distribution data transmitting unit, controls the communication unit 211 to transmit the distribution data including the audio data, the moving image data, and the metadata to the distributing site 103 (a step S305). It should be noted that in the preferred embodiment, the timing of transmitting the distribution data is assumed to be every frame, but the timing is not limited to this.

Next, the MPU 201, which functions as a hash value generating unit, generates the hash value by executing the hash function with respect to the distribution data stored in the buffer (a step S306). In the preferred embodiment, the step S306 is executed multiple times at the predetermined interval. That is, a plurality of hash values are generated at different timings for one piece of distribution data from the start to the end of transmission to the distributing site 103. It should be noted that the timing for generating the hash value is, as described above, the timing when the predetermined time has elapsed after starting the transmission of the distribution data, the timing when the predetermined number of frames have passed after starting the transmission of the distribution data, the timing when the image pickup apparatus 102 has moved by the predetermined distance or more, the timing when the subject of the video image photographed has been switched to the another subject, etc.

Next, the MPU 201, which functions as a transmitting unit, controls the communication unit 211 to transmit the distribution data on which the hash function has been executed, the generated hash value, and the hash value generation timing information indicating the generation timing of this hash value to the management system 101 at the timing when the hash value has been generated (a step S307). The management system 101 issues the authenticity guarantee number, which is the unique number within the management system 101, to the received distribution data, and transmits the issued authenticity guarantee number to the image pickup apparatus 102.

Next, the MPU 201 receives the authenticity guarantee number from the management system 101 (a step S308). Next, the MPU 201 transmits the received authenticity guarantee number to the distributing site 103 (a step S309). It should be noted that similar to the step S306, the steps S307 to S309 are also executed multiple times at the predetermined interval. As a result, a plurality of different authenticity guarantee numbers are transmitted to the distributing site 103. After that, the MPU 201 ends the data transmission processing. It should be noted that an encryption processing may be performed with respect to the data transmitted in the step S305, the step S307, and the step S309.

In this manner, in the preferred embodiment, when the image pickup apparatus 102 performs the photographing operation, the distribution data is distributed to the distributing site 103, and the hash value generated at the predetermined interval, the hash value generation timing information corresponding to the hash value generated at the predetermined interval, and the distribution data are transmitted to the management system 101.

Figure 4:
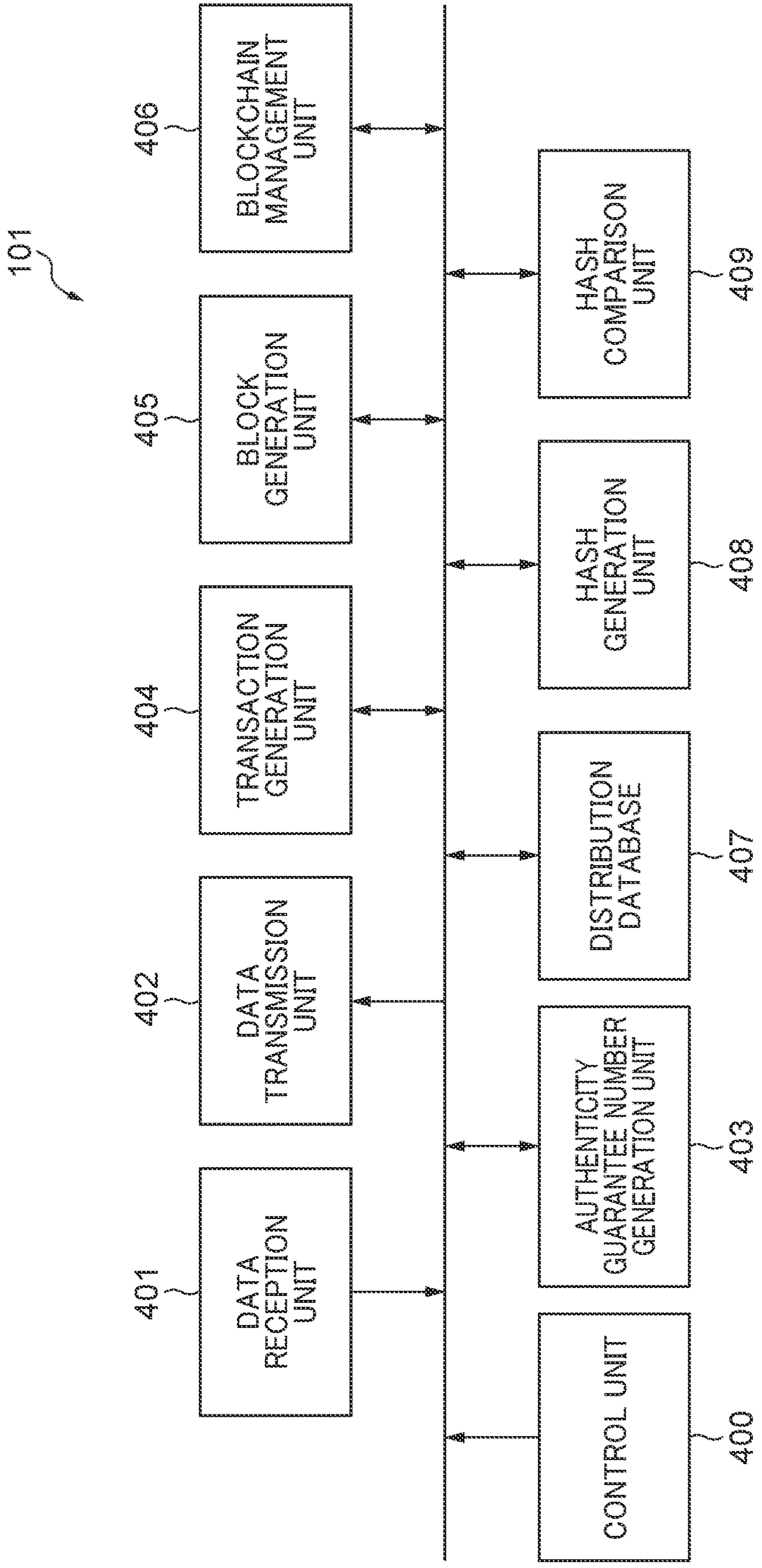
FIG. 4 is a block diagram that schematically shows a configuration of the management system shown in FIG. 1.

FIG. 4 is a block diagram that schematically shows a configuration of the management system 101 shown in FIG. 1. The management system 101 includes one or a plurality of computers connected to the network. As shown in FIG. 4, the management system 101 includes a control unit 400, a data reception unit 401, a data transmission unit 402, an authenticity guarantee number generation unit 403, a transaction generation unit 404, a block generation unit 405, a blockchain management unit 406, a distribution database 407, a hash generation unit 408, and a hash comparison unit 409.

The control unit 400 (a controller) controls the entire management system 101. The data reception unit 401 receives various types of data from the external apparatus. For example, the data reception unit 401 receives the distribution data, the hash value generated at the predetermined interval, and the hash value generation timing information corresponding to the hash value generated at the predetermined interval from the image pickup apparatus 102. In addition, the data reception unit 401 receives the distribution data and the authenticity guarantee number that are used for performing the authenticity determination from the communication device 105 operated by the viewer of the distributing site 103.

The data transmission unit 402 transmits various types of data to the external apparatus. For example, the data transmission unit 402 transmits the result of the authenticity determination to the communication device 105 operated by the viewer who has made the authenticity confirmation request of the distribution data. Furthermore, the authenticity guarantee number, which will be described below, is transmitted to the external apparatus such as the image pickup apparatus 102. Upon receiving the distribution data, the hash value, and the hash value generation timing information from the image pickup apparatus 102, the authenticity guarantee number generation unit 403 generates the authenticity guarantee number, which is the unique number within the management system 101.

The transaction generation unit 404 generates the transaction data and broadcasts the transaction data to the one or more computers (the nodes) participating in the blockchain peer-to-peer network 104. The transaction data includes the hash value and the hash value generation timing information that are received from the image pickup apparatus 102, and further includes the authenticity guarantee number that is generated when receiving the hash value and is associated with the hash value.

When the broadcasted transaction data is approved by the miner and the verification of the transaction data is completed, the block generation unit 405 generates the block, into which the transaction data has been written, and connects the generated block to the blockchain.

The blockchain management unit 406 manages the blockchain, which is held by one or a plurality of computers (the nodes) participating in the blockchain peer-to-peer network 104. In addition, the management system 101 and the nodes are synchronized so that the blockchains held by them always have the same contents.

The distribution data and the authenticity guarantee number corresponding to the distribution data are registered in the distribution database 407. For example, as shown in FIG. 5, the distribution database 407 includes a block ID 501, an authenticity guarantee number 502, a content name 503, and a divided section 504.

A block ID (an identification (ID) number) sequentially issued is set in the block ID 501 every time a block, into which the hash value has been written, is connected to the blockchain. That is, each block ID set in the block ID 501 corresponds to one of the hash values registered in the blockchain.

The authenticity guarantee number corresponding to the distribution data is set in the authenticity guarantee number 502. A unique name corresponding to the distribution data is set in the content name 503. In the divided section 504, information indicating that the hash value associated with the authenticity guarantee number is the hash value of data in which section of the distribution data is set. It should be noted that the configuration of the distribution database 407 is not limited to the above-described configuration, and the distribution database 407 may include other items.

Returning to FIG. 4, when performing the authenticity determination, the hash generation unit 408 generates the hash value by executing the hash function with respect to data obtained by dividing the distribution data transmitted from the communication device 105 together with the authenticity confirmation request according to the hash value generation timing information.

The hash comparison unit 409 obtains a block ID (described below) corresponding to the authenticity guarantee number transmitted from the communication device 105 together with the authenticity confirmation request, from the blockchain managed by the blockchain management unit 406. In addition, the hash comparison unit 409 obtains the hash value written into the block corresponding to the block ID in the blockchain. In this way, for example, the hash comparison unit 409 obtains a plurality of hash values, which are generated by executing the hash function with respect to the distribution data at different timings. The hash comparison unit 409 performs the authenticity determination by comparing the hash value obtained from the block with the hash value generated by the hash generation unit 408 according to the hash value generation timing information obtained from the same block. In the case that the two hash values (the hash value obtained from the block and the hash value generated by the hash generation unit 408 according to the hash value generation timing information obtained from the same block) match in all comparisons, the hash comparison unit 409 determines that the distribution data transmitted from the communication device 105 together with the authenticity confirmation request has not been falsified since the time of generation of the distribution data (determines that the distribution data transmitted from the communication device 105 together with the authenticity confirmation request is true). On the other hand, in the case that the two hash values do not match in any one of the all comparisons, the hash comparison unit 409 is able to determine that the distribution data transmitted from the communication device 105 together with the authenticity confirmation request has been falsified since the time of generation of the distribution data (is able to determine that the distribution data transmitted from the communication device 105 together with the authenticity confirmation request is not true, that is, is false). Furthermore, in the case of being determined that the distribution data transmitted from the communication device 105 together with the authenticity confirmation request has been falsified, it is possible to identify sections in the distribution data where the hash values do not match, and it is also possible to know in detail which part of the distribution data has been falsified.

For example, there is a case where the distribution data distributed to the communication device 105 has been falsified, and the falsified distribution data is transmitted to the management system 101 together with the authenticity confirmation request. In the case of receiving such an authenticity confirmation request, the hash value generated by the hash generation unit 408 by executing the hash function with respect to the falsified distribution data is different from the hash value generated based on the distribution data before the falsification. In addition, in the management system 101, the hash value stored in the blockchain cannot be changed by anyone. Therefore, in the case of receiving the above-described authenticity confirmation request, the hash value generated by the hash generation unit 408 by executing the hash function with respect to the falsified distribution data does not match the hash value stored in the block corresponding to the authenticity guarantee number of the authenticity confirmation request in the blockchain.

Figure 6:
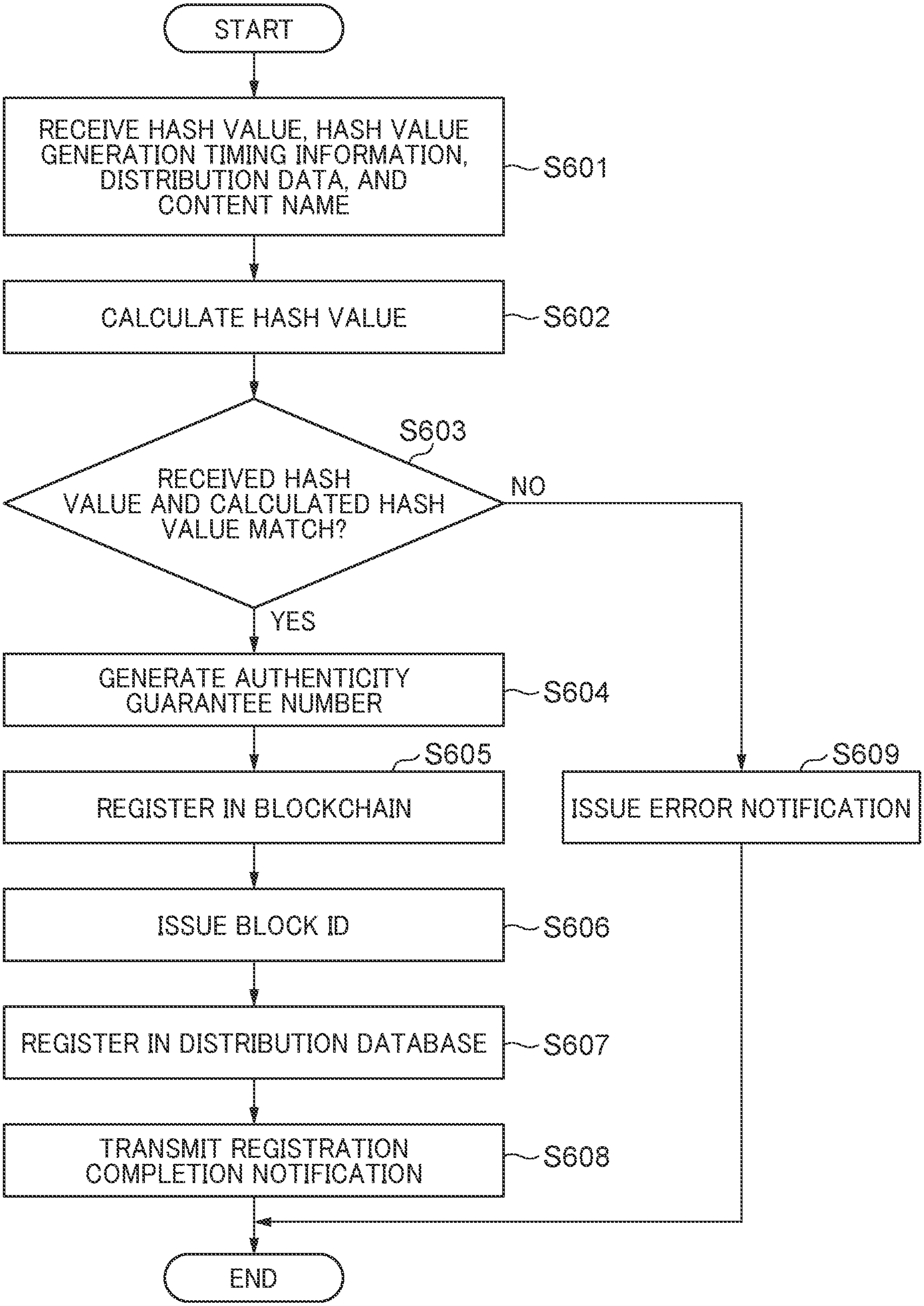
FIG. 6 is a flowchart that shows a procedure of a blockchain registration processing executed by the management system shown in FIG. 1.

FIG. 6 is a flowchart that shows a procedure of a blockchain registration processing executed by the management system 101 shown in FIG. 1. The blockchain registration processing shown in FIG. 6 is implemented by the control unit 400 executing a program stored in a recording medium included in the computer constituting the management system 101. The blockchain registration processing shown in FIG. 6 is executed, for example, when the hash value is transmitted from the image pickup apparatus 102.

As shown in FIG. 6, the control unit 400, which functions as an obtaining unit, receives (obtains) the hash value, the hash value generation timing information, the distribution data, and the content name that is the unique name corresponding to the distribution data from the image pickup apparatus 102 by means of the data reception unit 401 (a step S601). In the case that the received data has been subjected to the encryption processing (the received data has been encrypted), the control unit 400 performs a decryption processing with respect to the received data. Thereafter, the control unit 400 stores the hash value and the hash value generation timing information in a random access memory (RAM) (not shown).

Next, the control unit 400, which functions as a second hash value generating unit, generates the hash value of the distribution data received in the step S601 (a step S602). Specifically, the control unit 400 controls the hash generation unit 408 to divide the distribution data received in the step S601 according to the hash value generation timing information and generate the hash value by executing the hash function with respect to the divided data. Then, the control unit 400 determines whether or not the hash value received in the step S601 and the hash value calculated in the step S602 match (a step S603).

As a result of the determination in the step S603, in the case that the hash value received in the step S601 and the hash value calculated in the step S602 match, the blockchain registration processing proceeds to a step S604, which will be described below. On the other hand, as the result of the determination in the step S603, in the case that the hash value received in the step S601 and the hash value calculated in the step S602 do not match, the blockchain registration processing proceeds to a step S609. In the step S609, the control unit 400 issues an error notification indicating that it cannot be registered in the blockchain. After that, the blockchain registration processing ends.

In the step S604, the control unit 400, which functions as an identification number generating unit, controls the authenticity guarantee number generation unit 403 to generate the authenticity guarantee number for the received distribution data (the authenticity guarantee number of the received distribution data). Upper bits of the authenticity guarantee number are composed of a number indicating the distribution data (i.e., the number indicating the distribution data is the upper bits of the authenticity guarantee number), and lower bits of the authenticity guarantee number are composed of a number indicating the section in which the hash function has been executed in the distribution data (i.e., the number indicating the section in which the hash function has been executed in the distribution data is the lower bits of the authenticity guarantee number).

For example, in the case that the content name received in the step S601 has not been registered in the distribution database 407, the hash value received in the step S601 becomes a hash value generated based on the distribution data that has not been registered in the distribution database 407. In such a case, in the step S604, the control unit 400 sets the upper bits of the authenticity guarantee number of the hash value received in the step S601 to a unique number different from numbers that are the upper bits of the authenticity guarantee numbers of all the hash values registered in the distribution database 407.

On the other hand, in the case that the content name received in the step S601 has been registered in the distribution database 407, the hash value received in the step S601 becomes a hash value for another section of the distribution data that has been registered in the distribution database 407. In such a case, in the step S604, the control unit 400 sets the upper bits of the authenticity guarantee number of the hash value received in the step S601 to the same number as a number that is the upper bits of the hash value generated based on the same distribution data as the hash value received in the step S601. In addition, the control unit 400 sets the lower bits of the authenticity guarantee number of the hash value received in the step S601 to the next number after a number that is the lower bits of the hash value generated based on the same distribution data as the hash value received in the step S601. As an example, a case will be described in which data with a block ID "0", data with a block ID "1", data with a block ID "2", and data with a block ID "3" shown in FIG. 5 are registered in the distribution database 407, and in the step S601, the hash value, the hash value generation timing information, the distribution data, and the content name corresponding to a block ID "4" have been received. In this case, in the step S604, the control unit 400 sets the upper bits of the authenticity guarantee number of the hash value received in the step S601 to "1235" which is the same number as "1235" which is the number that is the upper bits of the hash value generated based on the same distribution data as the hash value received in the step S601. In addition, the control unit 400 sets the lower bits of the authenticity guarantee number of the hash value received in the step S601 to "0002" which is the next number after "0001" which is the number that is the lower bits of the hash value generated based on the same distribution data as the hash value received in the step S601. Thereby, in an authenticity determination processing shown in FIG. 8, which will be described below, it is possible to perform the authenticity determination for each section of the distribution data.

Next, the control unit 400, which functions as a registering unit, controls the transaction generation unit 404 and the block generation unit 405 to register the authenticity guarantee number generated in the step S604, the hash value stored in the RAM in the step S601, and the hash value generation timing information in the blockchain (a step S605). Specifically, first, the transaction generation unit 404 generates the transaction data including the authenticity guarantee number, the hash value, and the hash value generation timing information. Next, the transaction generation unit 404 broadcasts the transaction data to the one or more computers (the nodes) participating in the blockchain peer-to-peer network 104. When the broadcasted transaction data is approved by the miner and the verification of the transaction data is completed, the block generation unit 405 generates a block, into which the verified transaction data has been written, and connects the generated block to the blockchain (registers the generated block in the blockchain).

Next, the control unit 400 issues a block ID corresponding to the above block (a step S606). Here, the control unit 400 issues a value, which is generated by executing the hash function with respect to a header of the block twice, as the block ID. It should be noted that although the block ID is used to refer to the block, there is no field of the block ID within the block.

Next, the control unit 400 associates the issued block ID, the distribution data received in the step S601, and the authenticity guarantee number generated in the step S604 with each other and registers them in the distribution database 407 (a step S607). Next, the control unit 400 transmits a registration completion notification, which indicates that the processing of registering the information about the distribution data in the blockchain is completed, to the image pickup apparatus 102 (a step S608). Thereafter, the blockchain registration processing ends.

Figure 7:
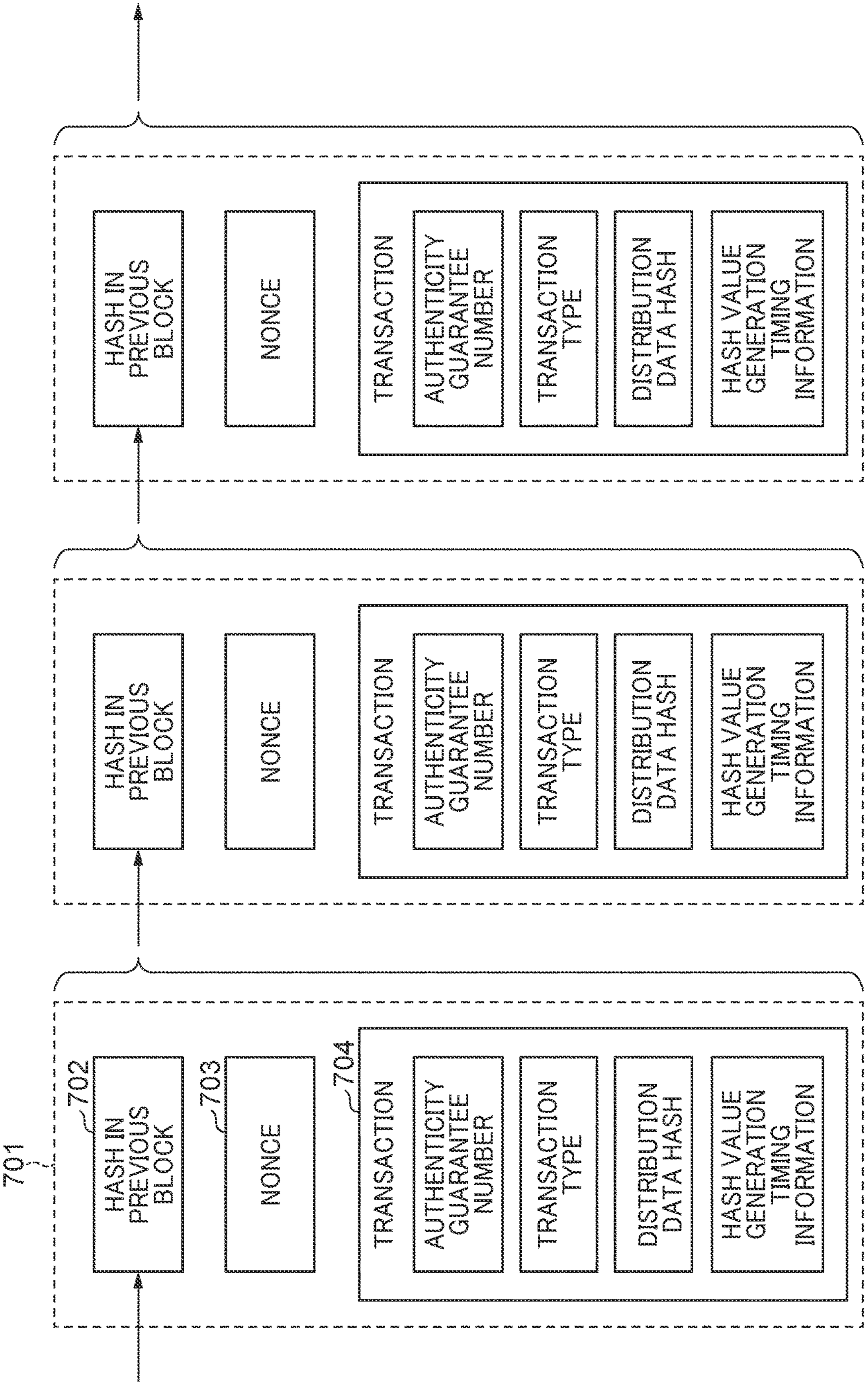
FIG. 7 is a diagram that shows an example of a block data structure of a blockchain managed by a blockchain management unit shown in FIG. 4.

FIG. 7 is a diagram that shows an example of a block data structure of the blockchain managed by the blockchain management unit 406 shown in FIG. 4. As shown in FIG. 7, the blockchain is a database formed by connecting blocks like chains in time series. A block 701 connected to the blockchain includes a hash in the previous block 702, a nonce 703, and a transaction 704.

The hash in the previous block (the hash of the previous block) 702 is a hash value of a block generated one block before the block 701. The nonce 703 is a nonce value used for mining. The transaction 704 is the transaction data generated by the transaction generation unit 404, and includes a transaction type, a distribution data hash, the hash value generation timing information, and the authenticity guarantee number.

The transaction type is information indicating the type of the transaction. The distribution data hash is a hash value transmitted from the image pickup apparatus 102 to the management system 101. The hash value generation timing information is the hash value generation timing information transmitted from the image pickup apparatus 102 to the management system 101 together with the hash value. The authenticity guarantee number is the authenticity guarantee number generated by the management system 101 when the hash value is received.

According to the preferred embodiment described above, the hash value of the distribution data is generated at the predetermined interval, and the generated hash value and the information indicating the timing when the hash value has been generated (i.e., the hash value generation timing information) are transmitted to the management system 101. As a result, it is possible to register the hash value, which is required for the authenticity determination of a real-time content such as the distribution data used for the live distribution of the video image photographed, in the blockchain. Hence, it is possible to guarantee the authenticity of the content distributed in real time while photographing.

Furthermore, in the preferred embodiment described above, the timing for generating the hash value is the timing when the predetermined time has elapsed after starting the transmission of the distribution data. As a result, it is possible to determine the authenticity of the distribution data until the predetermined time has elapsed after starting the transmission of the distribution data.

In the preferred embodiment described above, the timing for generating the hash value is the timing when the predetermined number of frames have passed after starting the transmission of the distribution data. As a result, it is possible to determine the authenticity of the distribution data until the predetermined number of frames have passed after starting the transmission of the distribution data.

In the preferred embodiment described above, the timing for generating the hash value is the timing when the image pickup apparatus 102 has moved by the predetermined distance or more. As a result, it is possible to determine the authenticity of the distribution data until the image pickup apparatus 102 has moved by the predetermined distance or more after starting the transmission of the distribution data.

In the preferred embodiment described above, the timing for generating the hash value is the timing when the subject of the video image photographed has been switched to the another subject. As a result, it is possible to determine the authenticity of the distribution data until the image pickup apparatus 102 has moved by the predetermined distance or more after starting the transmission of the distribution data.

In the preferred embodiment described above, the management system 101 obtains the distribution data, the hash value generated based on the distribution data at the predetermined timing, and the hash value generation timing information indicating the timing when the hash value has been generated, the image pickup apparatus 102. The management system 101 generates the hash value based on the distribution data according to this hash value generation timing information. In addition, the management system 101 generates the authenticity guarantee number for the distribution data. In the case that the obtained hash value and the generated hash value match, the management system 101 associates the obtained hash value and the hash value generation timing information with the authenticity guarantee number and registers them in the blockchain. As a result, it is possible to register the hash value, which is required for the authenticity determination of the real-time content such as the distribution data used for the live distribution of the video image photographed, in the blockchain. Hence, it is possible to guarantee the authenticity of the content distributed in real time while photographing.

Figure 8:
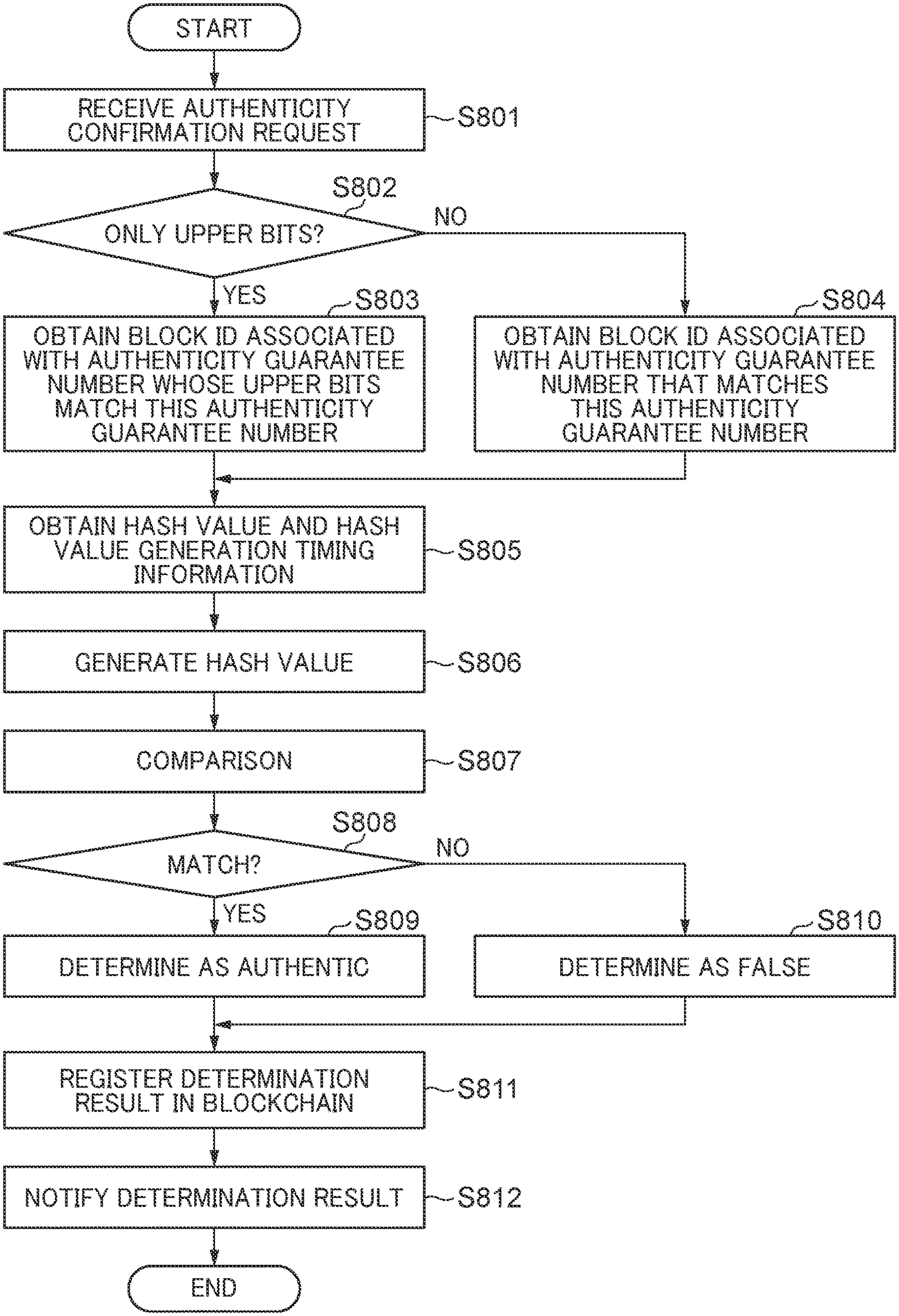
FIG. 8 is a flowchart that shows a procedure of an authenticity determination processing executed by the management system shown in FIG. 1.

FIG. 8 is a flowchart that shows a procedure of the authenticity determination processing executed by the management system 101 shown in FIG. 1. The authenticity determination processing shown in FIG. 8 is also implemented by the control unit 400 executing a program stored in the recording medium included in the computer constituting the management system 101. The authenticity determination processing shown in FIG. 8 is, for example, executed when the viewer of the distributing site 103 operates the communication device 105 to make the authenticity confirmation request of the distribution data displayed on the distributing site 103 to the management system 101.

As shown in FIG. 8, the control unit 400 causes the data reception unit 401 to receive the authenticity confirmation request from the communication device 105 operated by the viewer (a step S801). In the step S801, the control unit 400, which functions as a receiving unit, causes the data reception unit 401 to also receive distribution data that is a target of the authenticity determination and the authenticity guarantee number corresponding to the distribution data. It should be noted that in the preferred embodiment, in the case of performing the authenticity confirmation of the distribution data itself, the viewer specifies only the upper bits of the authenticity guarantee number. On the other hand, in the case of performing the authenticity confirmation of a specific section of the distribution data, the viewer specifies the entire authenticity guarantee number, that is, the viewer specifies both the upper bits and the lower bits of the authenticity confirmation. Next, the control unit 400 determines whether or not the received authenticity guarantee number includes only the upper bits (a step S802).

As a result of the determination in the step S802, in the case that the received authenticity guarantee number includes only the upper bits, the control unit 400 makes an inquiry to the distribution database 407 by using this authenticity guarantee number as a key. The control unit 400 obtains all block IDs associated with the authenticity guarantee numbers whose upper bits match this authenticity guarantee number (a step S803). As an example, a case where the authenticity guarantee number obtained in the step S801 is “1234” will be described. In this case, in the step S803, in the distribution database 407, the block ID “0”, the block ID “1”, and the block ID “2” associated with “12340001”, “12340002”, and “12340003” whose upper bits match this authenticity guarantee number (“1234”) are obtained. Next, the authenticity determination processing proceeds to a step S805, which will be described below.

As the result of the determination in the step S802, in the case that the received authenticity guarantee number includes the upper bits and the lower bits, the control unit 400 makes an inquiry to the distribution database 407 by using this authenticity guarantee number as a key. The control unit 400 obtains a block ID associated with the authenticity guarantee number that matches this authenticity guarantee number (a step S804).

Next, the control unit 400 accesses the block corresponding to the obtained block ID among a plurality of blocks constituting the blockchain managed by the blockchain management unit 406. The control unit 400 obtains the hash value and the hash value generation timing information that are stored in the block (the step S805).

Next, the control unit 400, which functions as a third hash value generating unit, generates the hash value of the distribution data received in the step S801 (a step S806). Specifically, the control unit 400 controls the hash generation unit 408 to divide the distribution data received in the step S801 according to the hash value generation timing information obtained in the step S805 and generate the hash value by executing the hash function with respect to the divided data.

Next, the control unit 400, which functions as a determining unit, performs the authenticity determination by causing the hash comparison unit 409 to compare the hash value obtained from the blockchain in the step S805 with the hash value generated in the step S806 (a step S807). For example, in the case that a plurality of hash values are obtained from the blockchain in the step S805, in the step S807, each of the plurality of hash values obtained from the blockchain is compared with its corresponding hash value. The corresponding hash value is the hash value generated in the step S806 based on the hash value generation timing information stored in the same block. The control unit 400 determines whether or not the two hash values (the hash value obtained from the blockchain in the step S805 and the hash value generated in the step S806) match in all comparisons (a step S808).

As a result of the determination in the step S808, in the case that the two hash values match in the all comparisons, the control unit 400 determines that the distribution data received in the step S801 is “true” indicating that it has not been falsified since the time of generation of the distribution data (a step S809). Next, the authenticity determination processing proceeds to a step S811, which will be described below.

As the result of the determination in the step S808, in the case that the two hash values do not match in any one of the all comparisons, the control unit 400 determines that the distribution data received in the step S801 is “false” indicating that it has been falsified since the time of generation of the distribution data (a step S810). It should be noted that in the case that the plurality of hash values are obtained from the blockchain in the step S805, it is possible to identify sections in the distribution data where the hash values do not match. Therefore, it is also possible to determine which section in the distribution data is “false”.

Next, the control unit 400 controls the block generation unit 405 to register the determination result of the step S809 or the determination result of the step S810 in the blockchain (a step S811). Specifically, the block generation unit 405 writes the determination result of the step S809 or the determination result of the step S810 into a block, and connects the block to the blockchain. Next, the control unit 400 causes the data transmission unit 402 to notify the communication device 105, which is a request source of the authenticity confirmation request, of the above determination result (a step S812), and then ends the authenticity determination processing.

In the preferred embodiment described above, in the authenticity determination according to the authenticity confirmation request, according to the hash value generation timing information registered in the blockchain and corresponding to the authenticity guarantee number received along with the authenticity confirmation request, the hash value is generated based on the distribution data received along with the authenticity confirmation request. In addition, the generated hash value is compared with the hash value registered in the blockchain and corresponding to the authenticity guarantee number received along with the authenticity confirmation request. As a result, it is possible to easily determine the authenticity of the distribution data.

In addition, in the preferred embodiment described above, the management system 101 includes at least a plurality of computers (nodes) that register the hash value of the distribution data in the blockchain in association with the authenticity guarantee number. As a result, in the configuration in which registration of the blockchain is performed by using the plurality of computers, it is possible to easily determine the authenticity of the distribution data by using the plurality of computers.

In addition, in the preferred embodiment described above, the management system 101 includes the hash generation unit 408. Thereby, it is possible to determine the authenticity of the distribution data transmitted from the user based on the distribution data transmitted from the user, without forcing the user making the authenticity confirmation request to generate the hash value of the distribution data.

It should be noted that in the preferred embodiment, the management system 101 may include a plurality of computers, at least a first computer that generates the authenticity guarantee number for the distribution data and a second computer that registers the hash value at the time of generation of the distribution data in the blockchain in association with the authenticity guarantee number.

In addition, in the preferred embodiment, although the configuration, in which the hash value generation timing information is transmitted to the management system 101 each time the hash value is transmitted, has been described, the present invention is not limited to this configuration. For example, the present invention may use such a configuration, in which when the hash value is first transmitted to the management system 101, the hash value generation timing information including information about all the timings for generating the hash value is transmitted to the management system 101.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-202069, filed on Dec. 19, 2022, which is hereby incorporated by reference herein in its entirety.

What is claimed is:

1. An image pickup apparatus comprising:

one or more processors; and a communication interface, wherein the one or more processors are configured to:

transmit, via the communication interface, distribution data used for live distribution of a video image to a distribution site for live distribution to one or more viewers, the distribution data including moving image data, audio data, and metadata;

during a single live distribution session after starting transmission of the distribution data to the distribution site, generate a plurality of hash values of respective portions of the distribution data at a predetermined interval;

transmit, via the communication interface, to a content management apparatus that registers the hash values in a blockchain, (i) each of the plurality of hash values, and (ii) timing information associated with each hash value, the timing information defining a portion of the distribution data for which the hash value is generated and including at least one of:

(a) elapsed time from the start of transmission of the distribution data, (b) a number of frames elapsed from the start of transmission of the distribution data, (c) a movement distance of the image pickup apparatus, or (d) a subject switching event in the video image;

receive, from the content management apparatus, a plurality of authenticity guarantee numbers respectively associated with the plurality of hash values registered in the blockchain; and transmit, via the communication interface, the plurality of authenticity guarantee numbers to the distribution site during the single live distribution session.

2. The image pickup apparatus according to claim 1, wherein a timing for generating the hash values is a timing when a predetermined time has elapsed after starting transmission of the distribution data.

3. The image pickup apparatus according to claim 1, wherein a timing for generating the hash values is a timing when a predetermined number of frames have passed after starting transmission of the distribution data.

4. The image pickup apparatus according to claim 1, wherein a timing for generating the hash values is a timing when the image pickup apparatus has moved by a predetermined distance or more.

5. The image pickup apparatus according to claim 1, wherein a timing for generating the hash values is a timing when a subject of the video image photographed has been switched to another subject.

6. The image pickup apparatus according to claim 1, wherein the one or more processors transmit, via the communication interface, the distribution data to the content management apparatus.

7. A control method for an image pickup apparatus including one or more processors and a communication interface, the control method executed by the one or more processors comprising:

a step of transmitting, via the communication interface, distribution data used for live distribution of a video image to a distribution site for live distribution to one or more viewers, the distribution data including moving image data, audio data, and metadata;

a step of, during a single live distribution session after starting transmission of the distribution data to the distribution site, generating a plurality of hash values of respective portions of the distribution data at a predetermined interval;

a step of transmitting, via the communication interface, to a content management apparatus that registers the hash values in a blockchain, (i) each of the plurality of hash values, and (ii) timing information associated with each hash value, the timing information defining a portion of the distribution data for which the hash value is generated and including at least one of:

(a) elapsed time from the start of transmission of the distribution data, (b) a number of frames elapsed from the start of transmission of the distribution data, (c) a movement distance of the image pickup apparatus, or (d) a subject switching event in the video image;

a step of receiving, from the content management apparatus, a plurality of authenticity guarantee numbers respectively associated with the plurality of hash values registered in the blockchain; and a step of transmitting, via the communication interface, the plurality of authenticity guarantee numbers to the distribution site during the single live distribution session.

8. A non-transitory computer-readable storage medium storing a program for causing a computer to execute a control method for an image pickup apparatus that includes one or more processors and a communication interface, the control method executed by the computer comprising:

a step of transmitting, via the communication interface, distribution data used for live distribution of a video image to a distribution site for live distribution to one or more viewers, the distribution data including moving image data, audio data, and metadata;

a step of, during a single live distribution session after starting transmission of the distribution data to the distribution site, generating a plurality of hash values of respective portions of the distribution data at a predetermined interval;

a step of transmitting, via the communication interface, to a content management apparatus that registers the hash values in a blockchain, (i) each of the plurality of hash values, and (ii) timing information associated with each hash value, the timing information defining a portion of the distribution data for which the hash value is generated and including at least one of:

(a) elapsed time from the start of transmission of the distribution data, (b) a number of frames elapsed from the start of transmission of the distribution data, (c) a movement distance of the image pickup apparatus, or (d) a subject switching event in the video image;

a step of receiving, from the content management apparatus, a plurality of authenticity guarantee numbers respectively associated with the plurality of hash values registered in the blockchain; and a step of transmitting, via the communication interface, the plurality of authenticity guarantee numbers to the distribution site during the single live distribution session.

* * * * *